(12) United States Patent
Tsutsumi et al.

(10) Patent No.: US 8,497,596 B2
(45) Date of Patent: Jul. 30, 2013

(54) POWER GENERATING APPARATUS OF RENEWABLE ENERGY TYPE AND METHOD FOR INSTALLING HYDRAULIC PUMP

(75) Inventors: Kazuhisa Tsutsumi, Tokyo (JP); Taku Ichiryuu, Akashi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 51 days.

(21) Appl. No.: 13/151,805

(22) Filed: Jun. 2, 2011

(65) Prior Publication Data

US 2012/0257994 A1 Oct. 11, 2012

Related U.S. Application Data

(63) Continuation of application No. PCT/JP2011/058646, filed on Apr. 5, 2011.

(51) Int. Cl.
*F03D 9/00* (2006.01)
(52) U.S. Cl.
USPC ............................................................. 290/55
(58) Field of Classification Search
USPC .................. 290/53–55, 42–44; 416/174, 142, 416/11, 132
See application file for complete search history.

(56) References Cited

U.S. PATENT DOCUMENTS

| | | | | |
|---|---|---|---|---|
| 2,028,448 A | * | 1/1936 | Harza | 416/168 R |
| 4,134,708 A | * | 1/1979 | Brauser et al. | 415/30 |
| 5,178,518 A | * | 1/1993 | Carter, Sr. | 416/11 |
| 2006/0251516 A1 | * | 11/2006 | Sohn | 416/132 B |
| 2010/0032959 A1 | | 2/2010 | Nies | |
| 2010/0301607 A1 | * | 12/2010 | Morimoto | 290/44 |

FOREIGN PATENT DOCUMENTS

| | | |
|---|---|---|
| DE | 463294 A | 7/1928 |
| DE | S63-34308 | 2/1988 |
| EP | 2 151 574 | 2/2010 |
| JP | 554-67852 A | 5/1979 |
| JP | S58-174719 | 10/1983 |
| JP | S62-89508 U | 6/1987 |
| JP | H06-129409 A | 5/1994 |

(Continued)

*Primary Examiner* — Jean F Duverne
(74) *Attorney, Agent, or Firm* — Manabu Kanesaka; Kenneth M. Berner; Benjamin J. Hauptman

(57) ABSTRACT

It is intended to provide a power generating apparatus of renewable energy type which can transmit large torque and has a low-cost and readily processable structure of fixing a hydraulic pump to the main shaft and a method of mounting the hydraulic pump. A plurality of key slots 25 are formed at an end on the back-end side of the main shaft 4. A plurality of keys 30A, 30B are inserted in the key slots 25. The keys 30A, 30B include a reference key 30A to be inserted in one of the key slots and a split key 30B to be inserted in the other of the key slots. The split key 30B is separated into a first key piece 34 having a projection to be inserted in a first groove formed in the main shaft and a second key piece 36 having a depression to be inserted in a second groove formed in the cylindrical member. The pair of key pieces 34, 36 are arranged so that the projection and the depression engage with each other. The projection and the depression of the first and second key pieces have side surfaces 34A, 34B, 36A and 36B formed along a radial direction of the main shaft 4. The side surfaces 34A, 34B, 36A and 36B are contact surfaces of the first and second key pieces 36 and incline with respect to the axial direction of the main shaft.

18 Claims, 10 Drawing Sheets

FOREIGN PATENT DOCUMENTS

| | | |
|---|---|---|
| JP | 2000-161458 | 6/2000 |
| JP | 2002-213842 | 7/2002 |
| JP | 2003-278640 A | 10/2003 |
| JP | U-3118509 | 1/2006 |
| JP | 2009-162305 | 7/2009 |
| JP | 2010-281274 A | 12/2010 |

* cited by examiner

A - A View

B View

G - G View

H View

K - K View

L - L View

POWER GENERATING APPARATUS OF RENEWABLE ENERGY TYPE AND METHOD FOR INSTALLING HYDRAULIC PUMP

RELATED APPLICATIONS

The present application is continuation from PCT International Application of PCT/JP2011/058646 filed Apr. 5, 2011, the disclosure of which is hereby incorporated by reference herein in its entirety.

TECHNICAL FIELD

The present invention relates to a power generating apparatus of renewable-energy type which transmits rotation energy of a rotor to a generator via a hydraulic transmission which is a combination of a hydraulic pump and a hydraulic motor as well as a method for installing the hydraulic pump. The power generating apparatus of renewable-energy type uses renewable energy such, as wind, tidal current, ocean current and river current to generate power. There are, for instance, a wind turbine generating apparatus, a tidal current generating apparatus, an ocean current generating apparatus, a river current power generating apparatus and the like.

BACKGROUND ART

Recently, from the perspective of environmental protection, a wind turbine generator using wind power and other wind turbine generator using renewable energy such as tidal current, ocean current and river current are becoming popular. In the renewable-energy type power generating apparatus, motion energy of wind, tidal current, ocean current or river current is converted to rotation energy of the rotor and the rotation energy is converted to electric power by a generator.

This type of power generating apparatus requires a step-up gear between the rotor and the generator as the rotation speed of the rotor is smaller than the rated rotation speed of the generator. Specifically, the rotation speed of the rotor is increased by the step-up gear to the rated rotation speed of the generator and then inputted to the generator.

To improve power generation efficiency, the power generating apparatus of renewable energy type becomes larger to improve power generation efficiency and the step-up gear becomes heavier and more expensive as well. In view of this, a power generating apparatus of renewable energy type which uses hydraulic transmission having a hydraulic pump and a hydraulic motor instead of the mechanical step-up gear, receives increased attention.

For instance, the wind turbine generating apparatus with the hydraulic transmission is disclosed in Patent Document 1 and Patent Document 2. The wind turbine generating apparatus with the hydraulic transmission has the hydraulic pump installed around the main shaft and the hydraulic motor driven by pressure oil from the hydraulic pump. This wind turbine generating apparatus drives the hydraulic pump by the rotation of the main shaft, rotates the hydraulic motor by the pressure oil supplied from the hydraulic pump and drives the generator by the rotation of the hydraulic motor.

CITATION LIST

Patent Literature

[PTL 1] US 2010/0032959A
[PTL 2] EP 09166576 A

SUMMARY OF INVENTION

Technical Problem

However, the torque of the main shaft of the wind turbine generator is significantly large. It is an issue as to now the large torque is transmitted from the main shaft to the hydraulic pump.

For instance, in a common method of transmit torque of the rotation shaft, low-cost and easily-processable keys are used. However, it is difficult to transmit large torque positively by means of such keys.

In this perspective, Patent Literature 1 and Patent Literature 2 fail to disclose a structure of fixing the hydraulic pump to the main cylinder in details or to provide a solution to the above issues of the wind turbine generator using the hydraulic transmission.

In power generating apparatuses of renewable energy type other than the wind turbine generator, it is necessary to solve the above issues as long as the hydraulic transmission is used.

In view of the above issues, it is an object of the present invention is to provide a power generating apparatus of renewable energy type which can transmit large torque and has a low-cost and readily process able structure of fixing a hydraulic pump to the main shaft, and a method of mounting the hydraulic pump.

Solution to Problem

To solve the above is sues, the present invention provides a power generating apparatus of renewable energy type, which may include, but is not limited to: a hub to which a blade is installed; a main shaft which is coupled to the hub at one end and has a plurality of first grooves formed on an outer periphery of the main shaft; a cylindrical member which is provided around the main shaft and has a plurality of second grooves formed on an inner periphery of the cylindrical member; a hydraulic pump which is installed on the main shaft via the cylindrical member; a hydraulic motor which is driven by pressure oil supplied from the hydraulic pump; and a generator which is coupled to the hydraulic motor. A plurality of key slots each of which is formed by a pair of each of the first grooves and each of the second grooves, extend along an axial direction of the main shaft and a plurality of keys are respectively in sorted in the key slots.

With the power generating apparatus of renewable energy type, the main shaft is coupled to the cylindrical member by the plurality of keys. Thus, it is possible to transmit large torque from the main shaft to the hydraulic pump via the plurality of keys.

Each of the keys can be easily manufactured in a short amount of time and a plurality of the keys can be provided at low cost.

It is preferable that the plurality of keys further includes a reference key which is inserted in one of the key slots and a split key which is separated into first and second key pieces and is inserted in the key slots other than the one of the key slot. The first and second key pieces of the split key have a side surface extending along a radial direction of the main shaft and the side surface is formed at least, partially into an inclined surface that inclines with respect, to the axial direction of the main shaft. The power generating apparatus may further include a key-piece moving mechanism, which moves at least one of the first and second key pieces of the split key within the key slot in the axial, direction of the main shaft.

As described above, the split key includes a pair of key pieces which are at least partially formed into the inclined surface and is installed in the key slot. And the at least one of the key pieces is moved in the axial direction of the main shaft within the key slot so as to displace the center line of the moved key piece in the circumferential direction of the main shaft by changing a position of the inclined surface. Thus, the cross-sectional shape of the split key as a whole can be changed and it is possible to conform the cross-sectional shape of the split key to the shape of the key slot constituted of the first and second grooves even if the first groove is slightly misaligned to the second groove in the circumferential direction. As a result, it is possible to bring the side surface of the split key in contact with the side walls of true key groove tightly and also to exert load equally on all of the keys.

The reference key that is inserted in one of the key slots may be a single-piece member which is not separated.

It is preferable that the split key is separated into the first and second key pieces at a separation plane which is parallel to the axial direction of the main shaft and along the radial direction of the main shaft, the side surface of the first and second key pieces has a portion that is in contact with a side wall of one of the first and second key grooves of the key slot and is parallel to the axial direction of the main shaft, the inclined surface is other one portion of the side surface of the first and second key pieces that is in contact with a side wall of the other of the first and second key grooves, and the key-piece moving mechanism moves both of the first and second key pieces within the key slot in the axial direction of the main shaft.

As described above, the other one portion that is in contact with the side wall of the other of the grooves, and the split key which is separated into the first and second key pieces at the separation place is provided in the key slots and the first and second keys are moved in the axial direction of the main shaft. Thus, the center line of the first and second key pieces can be displaced in the circumferential direction of the main shaft by the movement of the inclined surfaces. As a result, the cross-sectional shape of the split key as a whole is adjustable and thus, it is possible to bring the side surfaces of the split key into contact with the side walls of the key slot tightly so as to exert the load equally on all of the keys.

It is also preferable that the first and second key pieces of the split key are respectively inserted in the first and second grooves of the key slot, one of the first and second key pieces has a projection and the other of the first and second key pieces has a depression which engages with the projection of said one of the first and second key pieces, and the inclined surface of the first and second key pieces is a contact lateral face between the projection and the depression.

As described above, the first and second key pieces of the split key are respectively inserted in the first and second grooves so that, the key slot and the projection and the depression engage with each, other at the contact lateral face which is the inclined surface and the first and second key pieces are moved in the axial direction. As a result, it is possible to adjust the center line of the split key by the movement of the inclined surface.

It is also preferable that the hydraulic pump includes: a ring cam member which is installed around the outer periphery of the cylindrical member; a plurality of pistons which are driven by the ring cam member; and a cylinder which guides said plurality of pistons. The cylindrical member may be separated in the circumferential direction of the main shaft into a plurality of separated pieces each of which is provided for each of the key slots, and each of the separated pieces of the cylindrical member may be a contact surface which inclines with respect to the radial direction of the main shaft such that the farther the contact surface extends outwardly in the radial direction, the more the contact surface is displaced from the radial direction in a rotation direction of the main shaft.

The hydraulic pump is provided on the outer periphery of the cylindrical member and thus, the force from the pistons of the hydraulic pump is exerted on the cylindrical member via the ring cam. The total force acts in the tangential and radial directions of the main shaft as a tangential force and a radial force.

By the tangential force, the bending moment is applied to the separated piece to lift the separated piece to the side opposite to the rotation direction of the main shaft.

In view of this, the contact surface inclines with respect to the radial direction of the main shaft. As a result, the radial force is applied to past the end on a downstream side in the rotation direction toward the main shaft and the separated piece is prevented from lifting.

It is preferable that the ring cam member is separated in the circumferential direction of the main shaft in to a plurality of arc-shaped pieces, n1 that is a number of the separated pieces of the cylindrical member and n2 that is a number of the arc-shaped pieces satisfy a relationship of n1/n2=1/m where m is a natural number, and in the circumferential direction or the main shaft, a position, where the cylindrical member is separated into the separated pieces coincides with a position where the ring cam member is separated into the arc-shaped pieces.

As described above, the ring cam member is separated in the circumferential direction of the main shaft into a plurality of arc-shaped pieces and the position where the cylindrical member is separated into the separated pieces coincides with the position where the ring cam member is separated into the arc-shaped pieces. As a result, it is possible to reduce obstruction of an inner corner of the arc-shaped piece on the outer periphery of the separated piece of the cylindrical member and reduce obstruction of an outer corner of the separated-piece on the inner periphery of the arc-shaped piece.

The number of the arc-shaped pieces that are in contact with the outer periphery of each of the separated piece is m. As a result, the force from the piston of the hydraulic pump is applied equally on each the separated pieces via m number of the arc-shaped pieces. By this, the force can be equally exerted, via each of the separated key pieces upon the keys which are provided for each of the separated pieces.

It is also preferable that the ring cam member is separated in the circumferential direction, of the main shaft into a plurality of arc-shaped pieces, n1 that is a number of the separated pieces of the cylindrical member and n2 that is a number of the arc-shaped pieces satisfy a relationship of n1/n2=1/m where m is a natural number, and in the circumferential direction of the main shaft, a position where the cylindrical member is separated into the separated pieces is displaced from, a position where the ring cam member is separated into the arc-shaped pieces.

As described above, the ring cam member is separated in the circumferential direction of the main shaft into a plurality of arc-shaped pieces and the position where the cylindrical member is separated into the separated pieces is displaced with respect to the position where the ring cam member is separated into the arc-shaped pieces. As a result, the inner corners of all of the arc-shaped piece come in contact with the outer periphery of the separated piece of the cylindrical member and the outer corners of all of the separated-piece come in contact with the inner periphery of the arc-shaped piece. This prevents the obstruction of the inner corners of the arc-shaped pieces and the outer corners of the separated pieces with each other.

The number of the arc-shaped, pieces that are in contact with the outer periphery of each of the separated piece is m. As a result, the force from the piston of the hydraulic pump is applied equally on each the separated pieces via in number of the arc-shaped pieces. By this, the force can be equally exerted via each of the separated key pieces upon the keys which are provided for each of the separated pieces.

Each of the key slots may open at the other end of the main shaft which is on a side opposite to the one end of the main shaft that is coupled to the hub on an opposite side to a side of the main shaft coupled to the hub and an open end of each of the key slots may be covered by a cover member which is provided detachably on a side of the other end of the main shaft.

As described above, the key slot has an open end and thus, it is possible to insert the keys in the key slots after mounting on the outer periphery of the main shaft the cylindrical member to which the hydraulic pump is installed. As a result, it is possible to significantly reduce the time for mounting the hydraulic pump.

The cover member is provided so as to prevent the key from coming off.

The first groove of each of the key slots may be closed at the other end of the main shaft which is on a side opposite to the one end of the main shaft that is coupled to the hub. The second groove of each of the key slots may open at the other end of the main shaft. An open end of the second groove may be covered by a holding member which is provided detachably on a side of the other end of the main shaft to hold the cylindrical member.

The holding member which holds the cylindrical member is provided, to cover the open end of the second groove. Thus, it is possible to prevent the hydraulic pump from coming off.

The power generating apparatus may also include a pair of main shaft bearings which are provided between the one end of the main shaft coupled to the hub and the other end of the main shaft which is on a side opposite to the one end of the main shaft. The pair of main shaft bearings support the main shaft rotatably on a side of a main body. The hydraulic pump, the cylindrical member, the key slots and the keys are provided, at the other end of the main shaft.

As described above, the cylindrical member and the hydraulic pump are arranged closer to the side that is farther than the pair of the main shaft bearings are arranged so that the hydraulic pump which requires frequent maintenance can be installed or removed without removing the pair of the main shaft bearings. As a result, it is possible to install or remove the hydraulic pump in a short amount of time with easy by omitting the step of removing the main shaft bearings.

The power generating apparatus may be a wind power generating apparatus which rotates the main shaft by wind received on the blade and drives the generator by rotation of the main shaft.

The present invention also provides a method of mounting a hydraulic pump for a power generating apparatus of renewable energy type which comprises a hub to which a blade is installed, a main shaft which is coupled to the hub at one end, a cylindrical member which is provided around the main shaft, the hydraulic pump which is installed to the main shaft via the cylindrical member, a hydraulic motor which is driven by pressure oil supplied from the hydraulic pump and a generator which is coupled to the hydraulic motor. The method in relation to the present invention may include, but is not limited to, the steps of: forming a plurality of key slots in the circumferential direction of the main shaft so that the key slots extend along an axial direction of the main shaft, each of the key slots being constituted of a pair of a first groove formed on an outer periphery of the main shaft and a second grooved formed on an inner periphery of the cylindrical member; and inserting a plurality of keys respectively in the key slots to fix the cylindrical member to the main shaft.

According to the method, the main, shaft is coupled to the cylindrical, member by the plurality of keys. Thus, it is possible to transmit large torque from the main shaft, to the hydraulic pump via the plurality of keys.

Each of the keys can be easily manufactured in a short amount of time and a plurality of the keys can be provided at low cost.

The method of mounting the hydraulic pump may further include the steps of: before inserting the keys respectively in the key slots, installing the hydraulic pump and the cylindrical member from, the other end of the main shaft which is on a side opposite to the one end of the main shaft that is coupled to the hub by insertion, of the main shaft to the hydraulic pump and the cylindrical member; and after inserting the keys respectively in the key slots, covering open ends of the key slots each of which opens at the other end of the main shaft by a cover member.

As described above, the key slot has an open end and thus, it is possible to insert the keys in the key slots after mounting the cylindrical member to which the hydraulic pump is installed to the main shaft. As a result, it is possible to significantly reduce the time for mounting the hydraulic pump.

The cover member is provided so as to prevent the key from coming off.

Each of the key slots may be closed at the other end of the main shaft which is on a side opposite to the one end of the main shaft that is coupled to the hub. The second groove of each of the key slots may open at the other end of the main shaft. The method may further include the steps of: after inserting the keys respectively in the first grooves, installing the hydraulic pump and the cylindrical member from the other end of the main shaft by insertion of the main shaft to the hydraulic pump and the cylindrical member; and then covering an open end of the second groove by a holding member.

The key slot is closed at the other end of the main shaft and thus, the key does not come off.

The holding member covers the open end of the second groove so as to prevent the hydraulic pump from coming off.

Advantageous Effects of Invention

According to the present invention, when the main shaft has a large diameter, it is possible to structure the fixing structure with ease and at low cost, that is capable of transmitting large torque to the hydraulic pump.

DESCRIPTION OF EMBODIMENTS

A preferred embodiment of the wind turbine generator in relation to the present invention will now be described in detail with reference to the accompanying drawings. The explanations below are made in the case where the preferred embodiments are applied to the wind turbine generator. However, this should not limit the scope of the present invention and the present invention is also applicable to a hydraulic power generator.

It is intended that unless particularly specified, dimensions, materials, shape, its relative positions and the like shall be interpreted as illustrative only and not limitative of the scope of the present invention.

Figure 1:
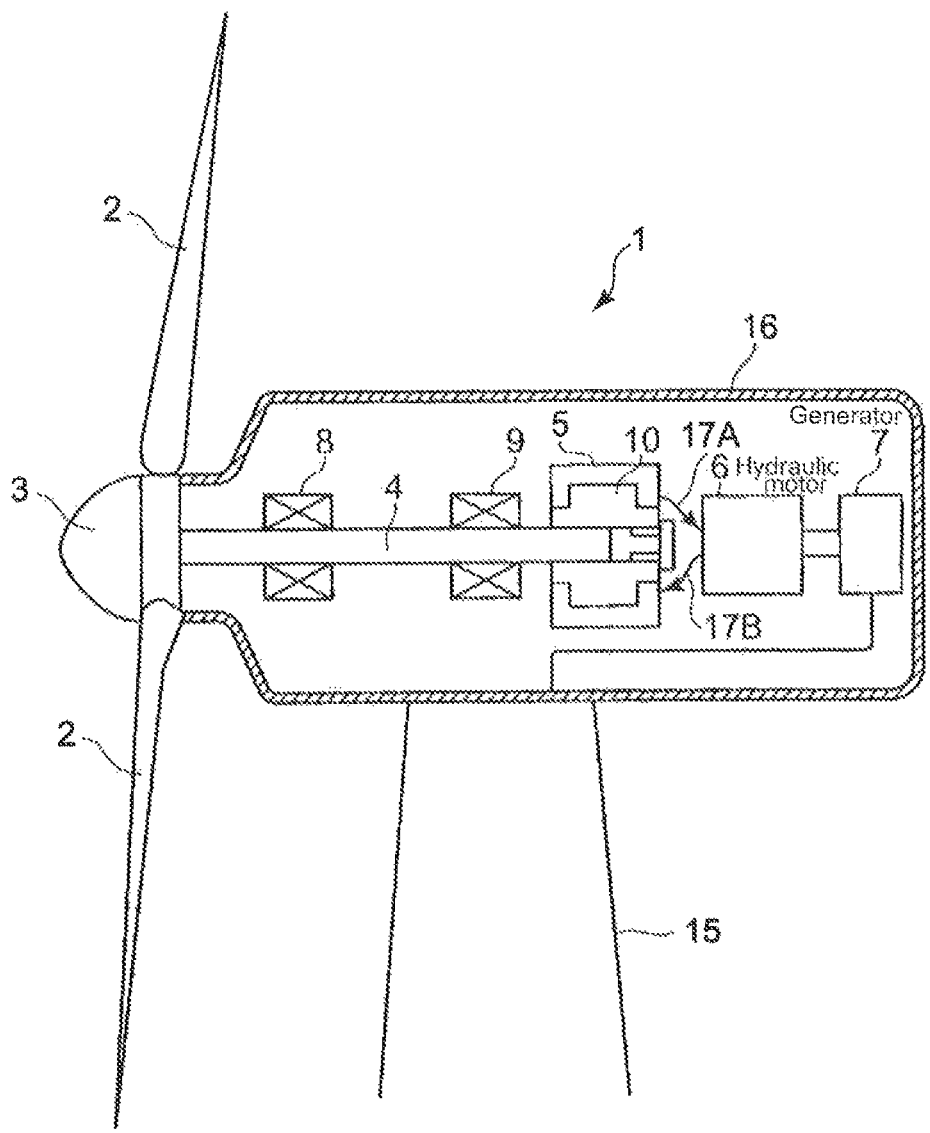
FIG. 1 is a schematic sectional view of a top part of a wind turbine generator in relation to a first preferred embodiment of the present invention.

FIG. 1 is a schematic sectional view of a top part of a wind turbine generator in relation to a first preferred embodiment of the present invention. The wind turbine generator 1 in relation to the preferred embodiment includes a hub 3 to which blades 2 are installed, a main shaft 4 which is coupled to the hub 3 at one end, a hydraulic pump 5 which is installed on the main shaft 4, a hydraulic motor 6 which is driven by pressure oil supplied from the hydraulic pump 5 and a generator 7 which is connected to the hydraulic motor 6. The main shaft 4, the hydraulic pump 5, the hydraulic motor 6 and the generator 7 are provided in a nacelle 16 mounted on a tower 15. The hydraulic pump 5 is disposed on the other end on a side opposite to a side where a pair of main shaft bearings 8 and 9 are arranged to support the main shaft rotatably to the nacelle. The hydraulic pump 5 is installed to the main shaft 4 via a cylindrical member 10 disposed on the outer periphery of the main shaft 4.

The hydraulic pump 5 is connected to the hydraulic motor 6 via a high-pressure oil passage 17A and a low-pressure oil passage 17B. The high-pressure oil passage 17A is provided between an outlet side of the hydraulic pump 5 and an inlet side of the hydraulic motor 6 and high-pressure oil produced in the hydraulic pump 5 streams in the high-pressure oil passage 17A. On the other hand, the low-pressure oil passage 17B is provided between an outlet side of the hydraulic motor 6 and an inlet side of the hydraulic pump 5 and low-pressure oil used in the hydraulic motor 6 streams in the low-pressure oil passage 17B.

Figure 2:
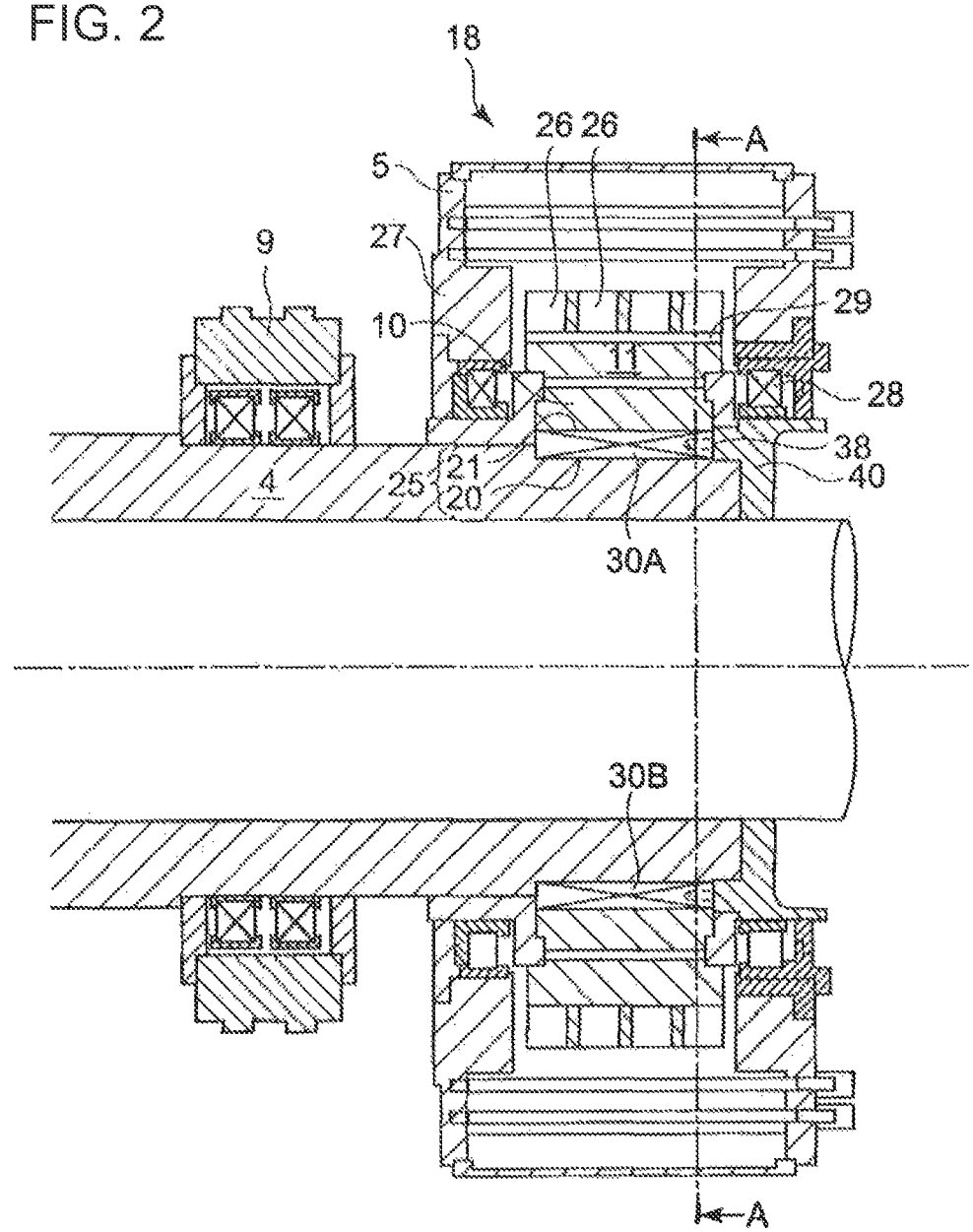
FIG. 2 is an enlarged view around a hydraulic pump installed to a main shaft.
Figure 3:
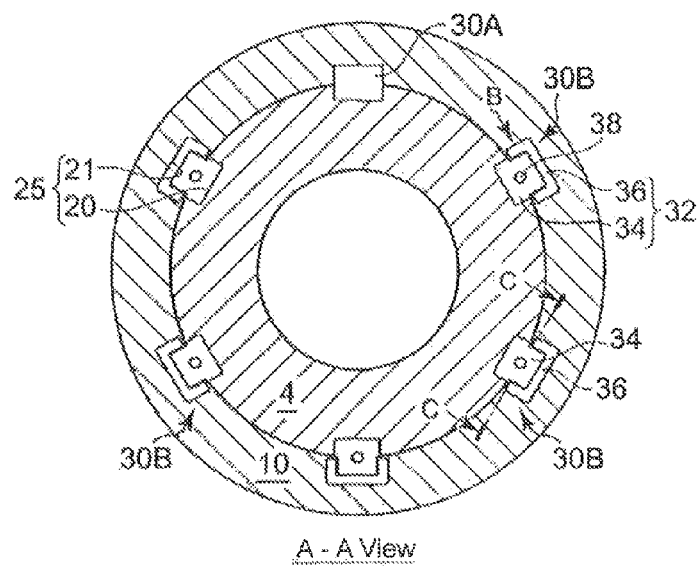
FIG. 3 is a cross-sectional view taken along the line A-A of FIG. 2.

FIG. 2 is an enlarged view around the hydraulic pump 5 installed to the main shaft 4, FIG. 3 is a cross-sectional view taken along the line A-A of FIG. 2. The hydraulic pump 5 is not shown, in FIG. 3.

As shown in FIG. 2 and FIG. 3, a plurality of key slots 25 are provided at the end of the main shaft that is on the side opposite to the one end of the main shaft that is coupled to the hub 3. The opposite end of the main shaft is hereinafter called a back-end side.

Each of the key slots 25 extends along the axial direction of the main shaft 4 and a plurality of key slots 25 are formed in the circumferential direction of the main shaft 4.

Each of the key slots 25 is formed by a pair of each of the first grooves 20 formed in the outer periphery of the main shaft 4 and each of the second grooves formed in the inner periphery of the cylindrical member 10. The first grooves 20 and the second grooves 21 are arranged at face-to-face positions.

A reference key 30A and a split key 30B are inserted in the key slots 25.

The reference key 30A is a single-piece key having a rectangular column shape. The reference key 30A is inserted in one of the key slots 25 before inserting the split key 30B in the key slots 25.

The split key 303 is formed by a pair of first and second key pieces 34 and 36 and is inserted in the key slots 25 other than the one in which the reference key 30 is already inserted.

Figure 4:
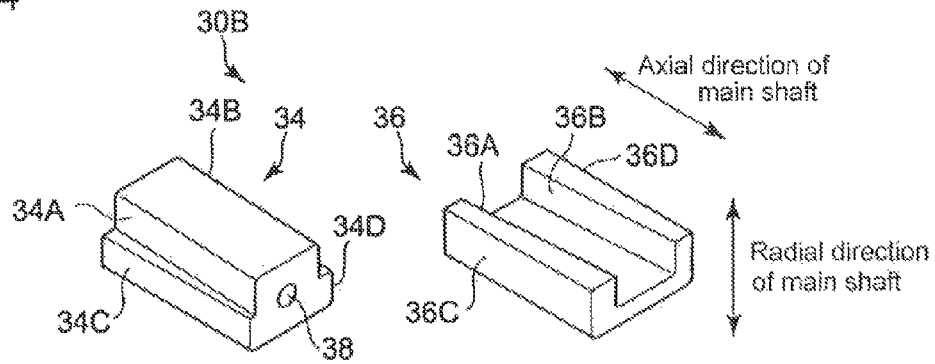
FIG. 4 is a perspective view of a split key.
Figure 5:
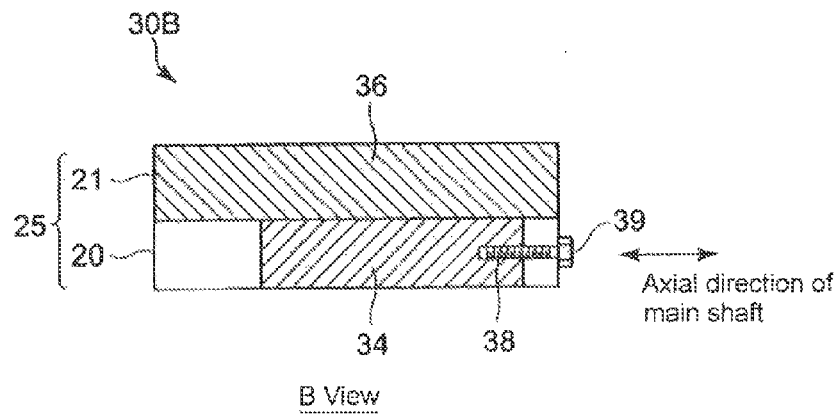
FIG. 5 is a fragmentary view taken in the direction of the arrow B of FIG. 3.

FIG. 4 is a perspective view of the split key 30B. FIG. 5 is a fragmentary view taken in the direction of the arrow B of FIG. 3.

FIG. 4 and FIG. 5 show the split key 30B which is formed by a first key piece 34 and a second key piece 36. The first key piece 34 has a projection and is fitted in the first groove 20 formed in the main shaft 4. The second key piece 36 has a depression formed in the cylindrical member 10.

The split key 30B is configured such that the projection of the first key piece 34 and the depression of the second key piece 36 engage with each other.

The projection of the first key piece 34 and the depression of the second key piece 36 have side surfaces 34A, 34B, 36A and 36B which are contact surfaces of the first key piece 34 and the second key piece 36 and extend along a radial direction of the main shaft 4. The side surfaces 34A, 34B, 36A and 36B incline with respect to an axial direction of the main shaft 4.

Both of the side surfaces 34A and 34B of the projection of the first key piece 34 are parallel to each other. The width between the side surfaces 34A and 34B is constant.

Both of the side surfaces 36A and 37B of the depression of the second key piece 36 are parallel to each other. The width between the side surfaces 36A and 36B is constant.

The length of the second key piece 36 in the axial direction of the main shaft 4 is the same as that of the key slot 25 in the axial direction of the main shaft 4. The second key piece 36 is kept fixed to the inside of the key slot 25.

The length of the first key piece 34 in the axial direction of the main shaft 4 is shorter that of the key slot 25 in the axial direction of the main shaft 4. The second key piece 36 is kept fixed to the inside of the key slot 25.

Therefore, there is clearance between an inner-end surface of the key slot 25 and the first key piece 34 and between the first key piece 34 and a cover member 40.

The first key piece 34 is moved in the axial direction of the main shaft forward and backward within the key slot 35 by a key-piece moving mechanism.

The key-piece moving mechanism is an adjusting screw 39 which is screwed into a screw hole 38 formed in an end face of the first key piece 34. The adjusting screw 39 is rotated to move the first key piece 34 in the axial direction in the amount of the clearance described above.

Figure 6A:
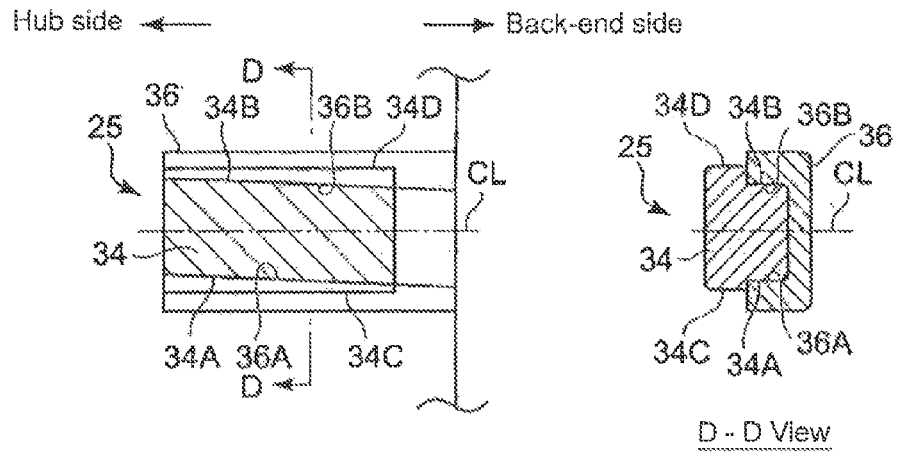
FIG. 6a is an explanatory view of moving a first key piece within a key slot in the axial, direction of the main shaft.
Figure 6B:
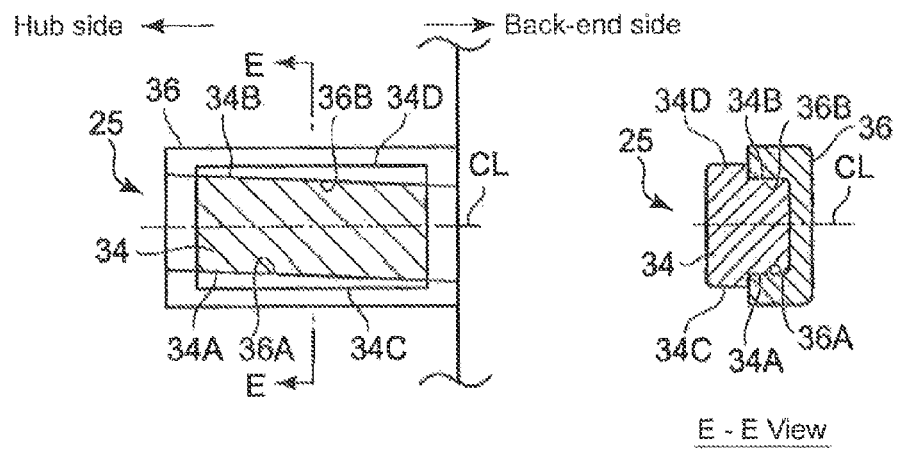
FIG. 6b is an explanatory view of moving the first key piece within the key slot in the axial direction of the main shaft.
Figure 6C:
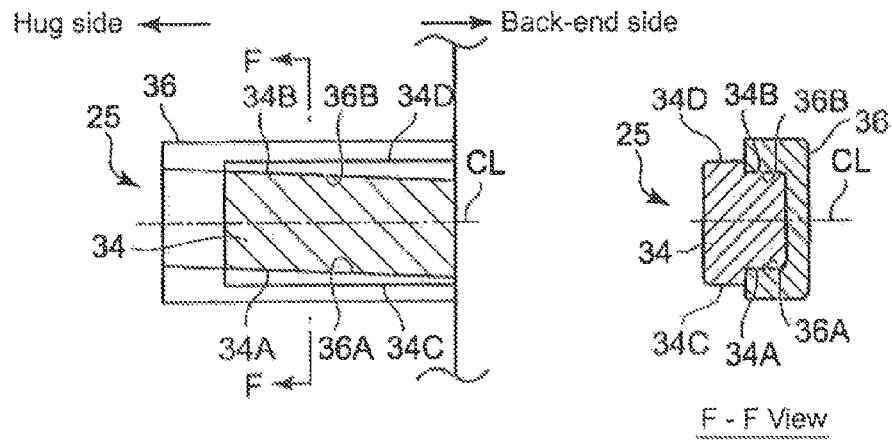
FIG. 6c is an explanatory view of moving the first key piece within the key slot in the axial direction of the main shaft.

FIG. 6 is an explanatory view of moving the first key piece 34 within the key slot 25 in the axial direction of the main shaft 4. The position of the first key piece 34 is illustrated in FIG. 6a to FIG. 6C. The fragmentary views taken along the line C-C of FIG. 3 are shown on the left-hand side of the drawings and cross-sectional views taken along the line D-D, E-E and F-F of the fragmentary views are shown on the right-hand side of the drawings. FIG. 6a shows the state where the first key piece 34 is at the most inward position of the key slot 25. FIG. 6b shows the state where the first key piece 34 is in the middle of the key slot 25. FIG. 6c shows the state where the first key piece 84 is at the most, outward position of the key slot 25 that is an entry part of the key slot 25.

The sectionals views taken along the lines D-D, E-F and F-F are cross-sectional views taken at the middle position of the key slot 25.

As shown in FIG. 6a to FIG. 6c, the first key piece 34 is moved within the key slot 25 in the axial direction of the main shaft 4 while the side surfaces 34A and 34B of the projection of the first key piece 34 are kept in contact with the side surfaces 36A and 36B of the depression of the second key piece 36. As a result, the center line of the first key piece 34 in the circumferential direction of the main shaft 4 is displaced. This is because the side surfaces 34A and 34B of the first key piece 34 and the side surfaces 36A and 36B of the second key piece 36 inclines with respect to the axial direction of the main shaft 4.

The cross-sectional shape of the split key as a whole is changed as desired and the side surfaces of the split key 32 are kept in contact with, the side walls of the key slot 25 that are formed in the circumferential direction of the main shaft 4 so that the load is placed equally all of the keys 30.

The hydraulic pump 5 described above is installed to the main shaft 4 in the following steps.

Figure 7:
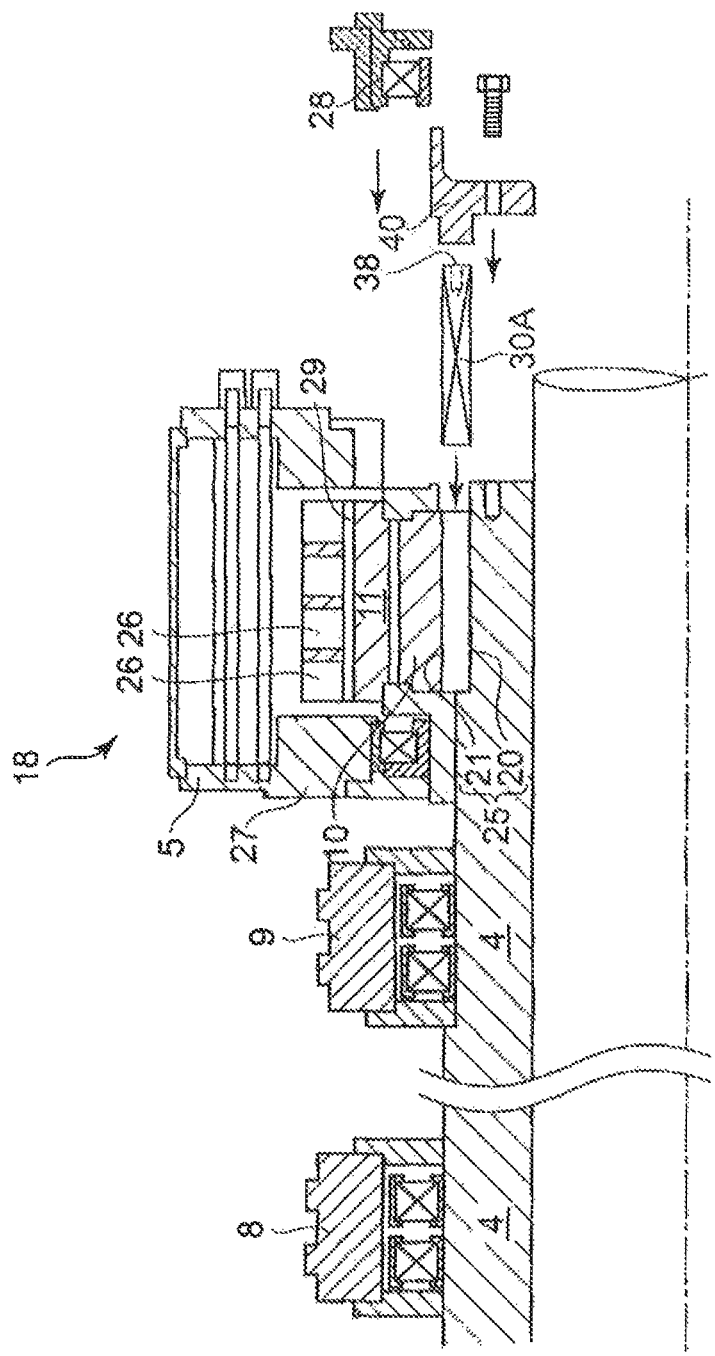
FIG. 7 is a view of installing the hydraulic pump to the main shaft.

FIG. 7 is a view of installing the hydraulic pump 5 to the main shaft.

FIG. 7 shows a hydraulic pump unit 18. The hydraulic pump 5 is mounted on the outer periphery of the cylindrical member 10 in advance. The hydraulic pump unit 18 is formed by the assembled set of the cylindrical member 10 and the hydraulic pump 5.

The hydraulic pump unit 18 including the cylindrical member 10 and the hydraulic pump 5 is installed to the outer periphery of the main shaft 4 so that the first grooves 20 formed in the main shaft 4 and the second grooves 21 formed in the cylindrical member are at the face-to-face positrons. A pair of main shaft bearings 8 and 9 are installed to the main shaft 4 before installing the cylindrical member 10 to the outer periphery of the main shaft 4.

Next, the reference key 30A is installed in one of the key slots 25 and then, the split keys 30B are in sorted respectively in the key slots 25 other than the one. In this process, the split keys 30B are installed in the key slots 25 while the first key piece 34 is moved with respect to the second key piece 36 in the axial and circumferential directions of the ma in shaft 4.

After installing all of the split keys 30 in the key slots 25 respectively, the cover member 40 is installed to the end on the back-end side of the main shaft so as to prevent the reference key 30A and the split keys 30B from coming off.

Finally, a pump bearing 28 is installed to support the hydraulic pump.

The hydraulic pump 5 may be installed to the cylindrical member 4 before or after installing the cylindrical member 10 to the main shaft 4.

As shown in FIG. 2, the hydraulic pump 5 may include a variety of parts such as a ring cam 29 installed to the outer periphery of a main body 11 of the cylindrical member 10, pistons 26 driven by the ring cam 29, a casing which houses the ring cam 29 and the pistons 26, a pump bearing 28 which is provided between the casing 27 and the cylindrical member 10. The hydraulic pump 5 constituted of a variety of parts requires maintenance more frequently than the main shaft, bearings 8 and 9.

Therefore, the cylindrical member 10 and the hydraulic pump 5 are provided closer to the back-end side than the pair of the main shaft bearings 8 and 9 so that the hydraulic pump unit 18 including the hydraulic pump 5 which requires frequent maintenance can be installed or removed without removing the pair of the main shaft bearings 8 and 9.

As described above, the main shaft 4 and the cylindrical member 10 are connected by the keys 30A and 30B and thus, it is possible to transmit large torque from the main shaft 4 to the hydraulic pump 5. Each of the keys 30A and 30B can be easily manufactured in a short amount of time and a plurality of the keys can be provided at low cost.

The reference key 30A is installed in the one of the key slot 25 and then, the split keys 30B are installed in all the key slots 25 other than the one. Thus, the keys 30A and 30B can be installed easily in a short amount of time.

Specifically, when installing the reference key 30A in a first one of the key slots 25, all other key slots 25 are still empty and the main shaft 4 and the cylindrical member 10 can be moved in the circumferential direction and thus, the reference key 30A can be installed easily in a short amount of time.

In the next step, if the reference key 30A is installed in a second one of the key slots 25 as well, it takes a great amount of time to install the reference key 30A in the second one of the key slots 25 in which the second groove 21 may be slightly misaligned relative to the first groove 20, because the main shaft 4 and the cylindrical member 10 are fixed in the circumferential direction by the reference key 30 inserted in the first one of the key slots 25. However, in the preferred embodiment of the present invention, the split key 30B includes the first and second key pieces 34 and 36 having the side surfaces 34A, 34B, 36A and 36B which incline with respect to the axial direction of the main shaft 4. And the first key piece 34 is movable with respect to the second key piece 36 in the circumferential direction of the main shaft 4 and thus, even if the second groove 21 is slightly misaligned relative to the first key groove 20, it is possible to install the split key 30B easily in a short amount of time.

When installing the split key 30B in the key slots 25, the first key piece 34 can be moved in both the axial direction and the circumferential direction of the main shaft 4. Thus, the side surfaces 34A, 34B, 36A and 36B of the first and second key pieces 34 and 36 can be kept tightly in contact with the side walls of the first and second, grooves 20 and 21 on the circumferential side of the main shaft 4. By this, the load can be place equally on the reference key 30A and the split keys 30B.

Each of the key slot 25 is apertured and thus, it is possible to install the reference key 30A and the split keys 30B after installing the hydraulic pump unit 18 including the cylindrical member 10 and the hydraulic pump 5. This reduces the installation time significantly in comparison to, for instance, the case of installing the hydraulic pump unit 18 to engage with the key installed to the main shaft 4 in the key slot formed in the hydraulic pump unit 18.

The cover member 40 is provided to prevent the reference key 30A and the split keys 30B from coming off.

Next, a second preferred embodiment of the present invention is explained. In the following explanation, the same reference numerals are given without adding explanations for those components that area already described in the first preferred embodiment. Mainly configurations different from the previous preferred embodiment are explained hereinafter.

Figure 8:
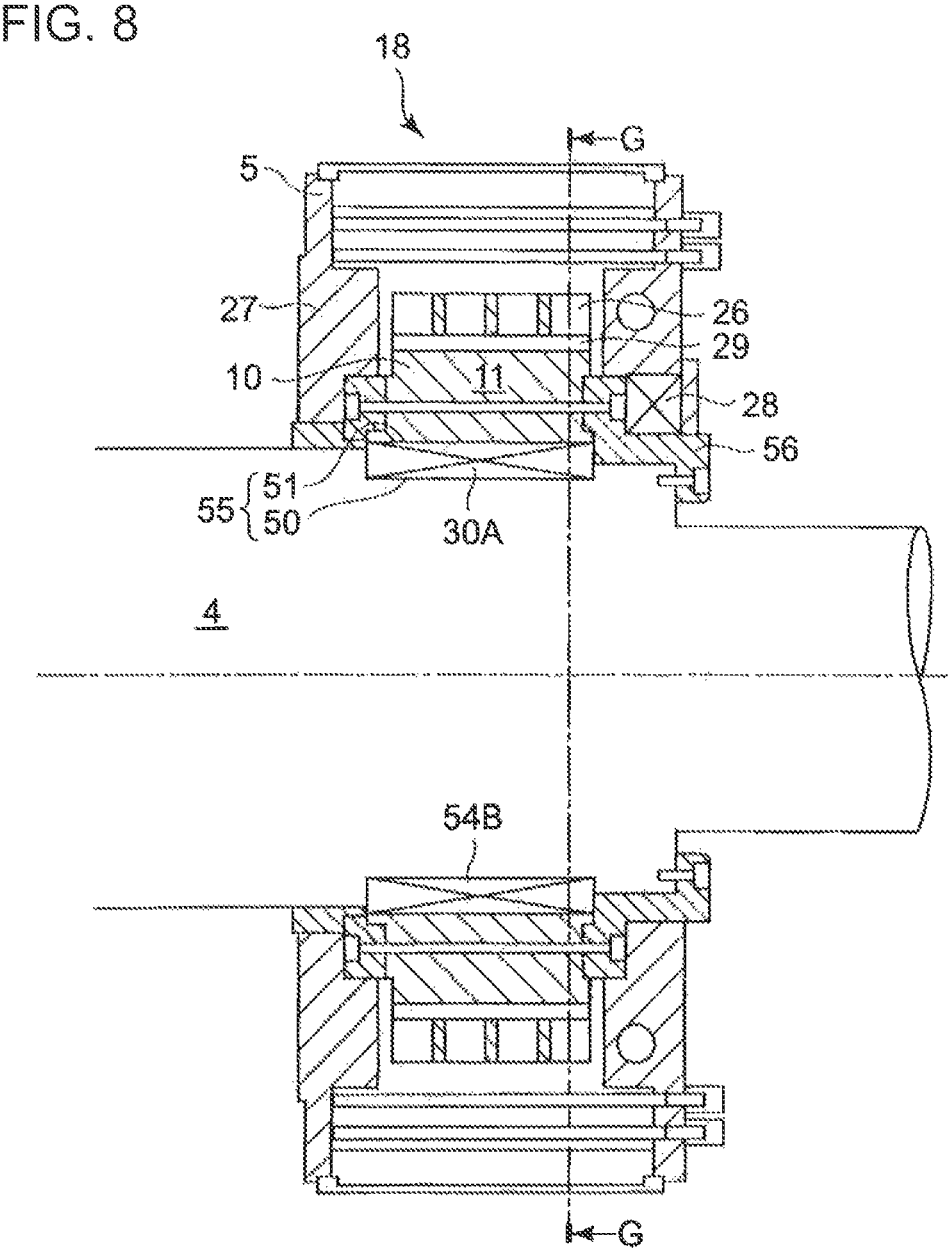
FIG. 8 is an enlarged view around the hydraulic pump installed to the main shaft.
Figure 9:
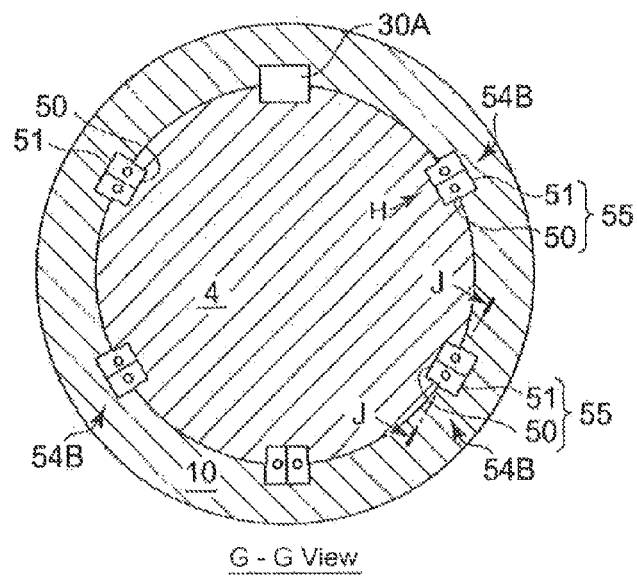
FIG. 9 is a cross-sectional view taken along the line G-G of FIG. 8.

FIG. 8 is an enlarged view around the hydraulic pump 5 installed to the main shaft 4. FIG. 9 is a cross-sectional view taken along the line G-G of FIG. 8. The hydraulic pump 5 is omitted, from FIG. 9.

FIG. 8 and FIG. 9 show a holding member 56 which is provided at the end on the back-end side of the main shaft. The holding member 56 is provided to prevent the first groove 50 formed in the outer periphery of the main shaft 4, the second groove 51 formed in the inner periphery of the cylindrical member 10, the reference key 30A, the split keys 54B and the hydraulic pump 5 from coming off.

The second, groove 51 is apertured at the other end on the back-end side of the main shaft 4. The holding member 56 is detachably installed to the other end of the main shaft so as to cover the open end of the second groove 51.

Figure 10:
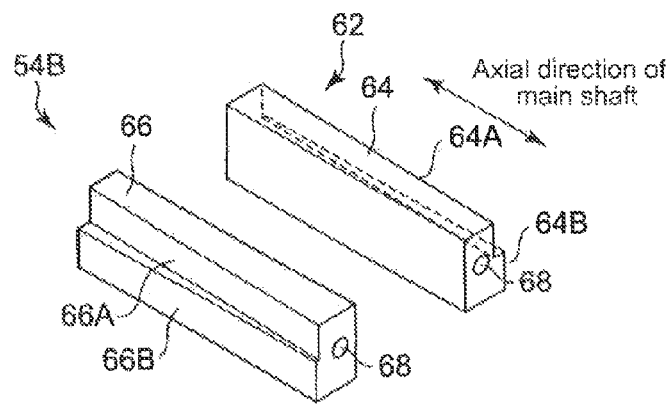
FIG. 10 is a perspective view of the split key.
Figure 11:
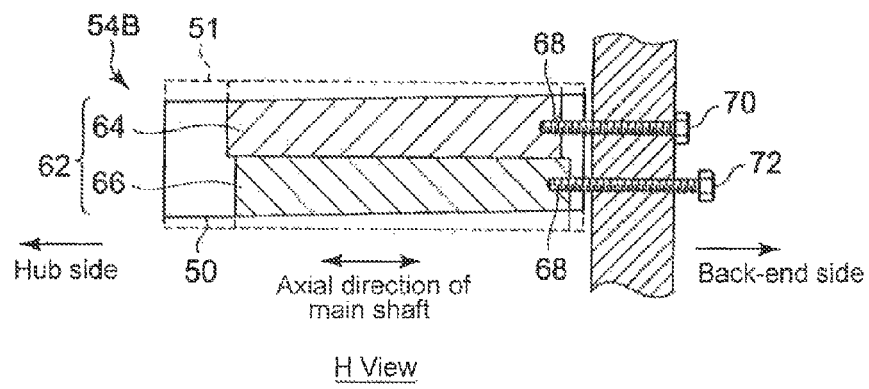
FIG. 11 is a fragmentary view taken in the direction of the arrow H of FIG. 9.

FIG. 10 is a perspective view of the split key 62, FIG. 11 is a fragmentary view taken in the direction of the arrow H of FIG. 9.

FIG. 10 and FIG. 11 show a split key 54B. The split key 54B is separated into a pair of key pieces 64 and 66 at a separation plane which is parallel to the axial direction of the main shaft 4 and along the radial direction of the main shaft 4.

The first key piece 64 and the second key piece 66 have the side surfaces 64A, 64B, 66A and 66B respectively. Among those side surfaces of the first and second key pieces 64 and 66, the side surfaces 64B and 66B that are in contact with the side walls of the second groove 51 are parallel to the axial direction of the main shaft 4.

Among the side surfaces 64A, 64B, 66A and 66B of the first and second, key pieces 64 and 66, the side surfaces 64A and 66A that are in contact with the side walls of the first groove 50 on the circumferential side incline with respect to the axial direction of the main shaft 4. The inclined side surfaces 64A and 66A incline at the same inclination angle as the first groove 50 which is described later.

The first groove 50 inclines with respect to the axial direction of the main shaft 4.

The axial length of the first groove 50 is longer than the axial length of the split keys 54B. This allows the split keys 54B to move in the axial direction.

The first groove 50 is closed at the other end on the back-end side of the main shaft 4. Thus, the reference key 30A and the split keys 54B do not come off toward the back-end side.

The split key 54B has the key-piece moving mechanism which moves the first key piece and the second key piece forward and backward in the axial direction of the main shaft within the key slot 55.

The key-piece moving mechanism includes a first adjusting screw 70 and a second adjusting screw 72. The first adjusting screw 70 is threaded in a screw hole 68 formed on an end surface of the first key piece 34. The second adjusting screw 72 is threaded in another screw hole 68 formed on an end surface of the key piece 36.

The lengths of the first groove 50 and the second groove 51 in the axial direction is longer than the lengths of the first key piece 64 and the second key piece 66 in the axial direction. The first key piece 64 and the second key piece 66 cam be moved in the axial direction respectively by turning the first and second adjusting screws 70 and 72.

Specifically, the first adjusting screw 70 is rotated in a direction of tightening the first adjusting screw 70 so as to move the first key piece 64 to the back-end side. Meanwhile, the first adjusting screw 70 is rotated in a direction of loosening the first adjusting screw 70 so as to move the first key piece 64 to the hub side. The second key piece 66 is movable in the same manner as the first key piece 64. The first key piece 64 and the second key piece 66 are moved in opposite directions to each other by turning the first adjusting screw 70 and the second adjusting screw 72 in the opposite directions to each other.

FIG. 12 is an explanatory view of moving the first and second, key pieces 64 and 66 within the key slot 55 in the axial direction of the main shaft 4.

Figure 12A:
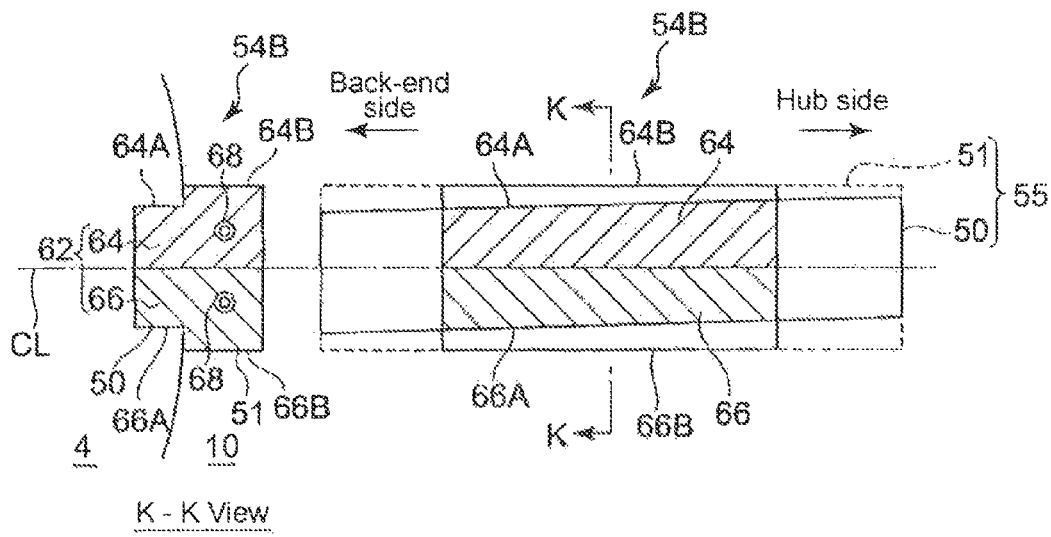
FIG. 12a is an explanatory view of moving first and second key pieces within the key slot in the axial direction of the main shaft.
Figure 12B:
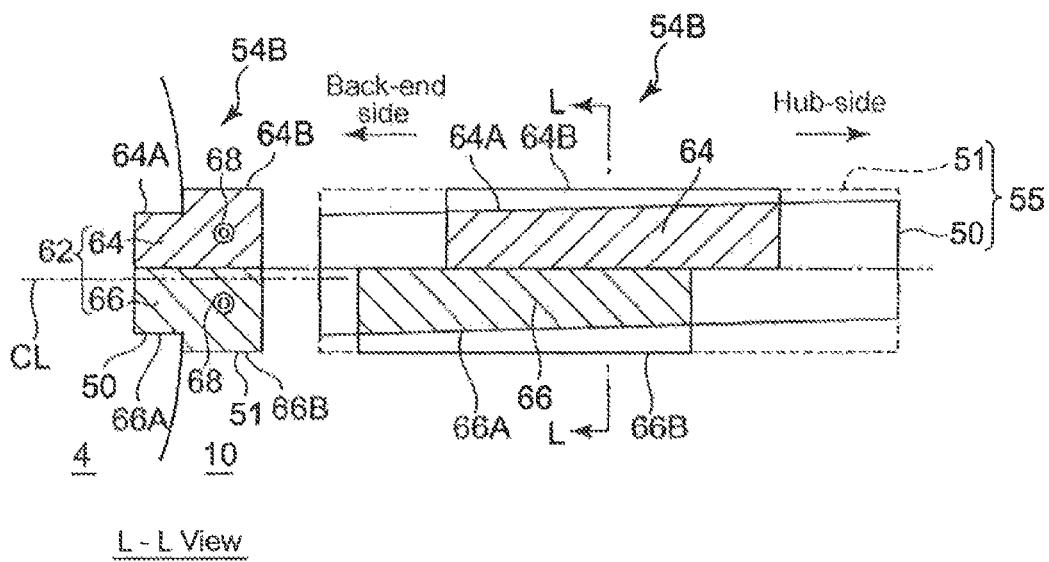
FIG. 12b is an explanatory view of moving the first and second key pieces within the key slot in the axial direction of the main shaft.

The positions of the first key piece 64 and the second key piece 66 are illustrated in FIG. 12a and FIG. 12b. The fragmentary views taken along the line J-J of FIG. 9 are illustrated on the right-hand side and cross-sectional views taken along the lines K-K and L-L of the fragmentary views are shown on the left-hand side of the drawings. FIG. 12a shows the state where the first, and second key pieces 64 and 66 are in the middle of the key slot 55, FIG. 6c shows the state where the first key piece 64 is in the middle of the key slot 55 and the second key piece 66 is at the most outward position on the back-end side of the key slot 55.

The sectionals views taken along the lines K-K and L-L are cross-sectional views taken at the middle position of the key slot 55.

As shown in FIG. 12a and FIG. 12b, the first key piece 64 and the second key piece 66 are moved in the axial direction of the main shaft 4 while the side surfaces 64A and 66A of the first and second key pieces 64 and 66 are kept in contact with the side walls of the first groove 50 on the circumferential side of the main shaft 4. As a result, the center line of parts of the first key piece 64 and the second key piece 66 that are inserted in the first groove 50 on the circumferential side of the main shaft 4 is displaced. This is because the side surfaces 64A of the first key piece 64 and the side surface 66A of the second key piece 66 incline with respect to the axial direction of the main shaft 4.

The cross-sectional shape of the split key 62 as a whole is changed as desired and the side surfaces of the split key 62 comes in contact tightly with the side walls of the key slot 55 on the circumferential side of the main shaft 4 so that the load is placed equally on all of the keys 30A and 62.

The hydraulic pump 5 described above is installed to the main shaft 4 in the following steps.

The split key 62 is inserted in the first groove 50 as shown in FIG. 8. In this process, the first key 64 is inserted such as to touch the inner end surface of the first groove that is on the hub side. Next, the second key piece 66 is inserted at the end in the key groove 50 that is on the back-end side. Then, the second key piece 66 is moved toward the hub side so that the side surface 66A of the second key piece 66 is in tight contact with the side wall of the first groove. The first key piece 64 is moved to the back-end side for fine adjustment to bring the side surface 64A in contact with the side wall of the first groove 50 tightly. The lower part of the split key 62 is fit in the first groove 50 while the upper part of the split key 62 is exposed on the outer periphery of the main shaft 4. The key piece that is the first one to be inserted in the first groove 50 is one of the first and second key pieces, which has a larger surface area at the other end which is on the opposite side to the end surface having the screw hole 68. And the first one of the key pieces is arranged on the hub side (inner side) in the first groove 50.

Meanwhile, the hydraulic pump 5 is installed to the outer periphery of the cylindrical member 10 in advance to form the hydraulic pump unit 18 (the cylindrical member 10 and the hydraulic pump 5). Assembling of the hydraulic pump 5 may be performed in parallel with the insertion of the split key 62 in the first groove 50 or after the installation of the cylindrical member 10 to the main shaft 4

Next, the hydraulic pump unit 18 (the cylindrical member 10 and the hydraulic pump 5) is installed to the outer periphery of the main shaft 4 from the back-end side of the main shaft. In this process, the hydraulic pump unit 18 is installed to the main shaft 4 while fitting the upper part of the split key 62 in the second groove 51.

Then, the holding member 56 is installed to the back-end part of the main shaft so as to prevent the hydraulic pump unit 18 from coming off to the back-end side.

Finally, the pump bearing 28 is installed to support the hydraulic pump 5.

According to the above structure for fixing the hydraulic pump of the preferred embodiment, the split key 54 is separated into a pair of key pieces 64 and 66 and the first and second key pieces 64 and 66 are moved in the axial direction of the main shaft so that the side surfaces 64A and 66A of the first and second key pieces 64 and 66 come in contact tightly with the side walls of the first groove 50 on the circumferential side so that the load is equally placed on the reference key 30A and the split keys 54B.

The holding member 56 is provided to cover the open end of the second groove 51. Thus, the hydraulic pump unit 18 (cylindrical, member 10 and the hydraulic pump 5) is prevented from coming off.

A third preferred embodiment of the present invention is explained below.

Figure 13:
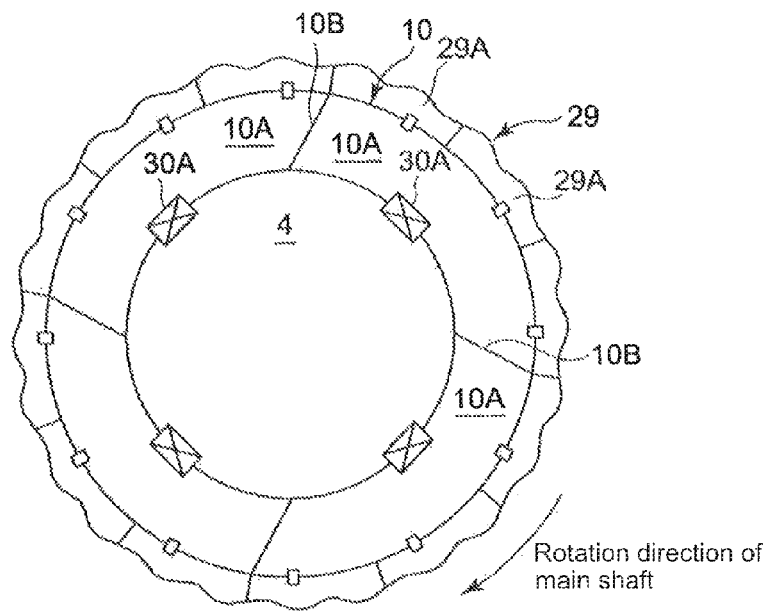
FIG. 13 is a cross-sectional view of the main shaft to which the hydraulic pump is installed and the main shaft, a cylindrical member and a ring cam are also shown in the drawing.
Figure 14:
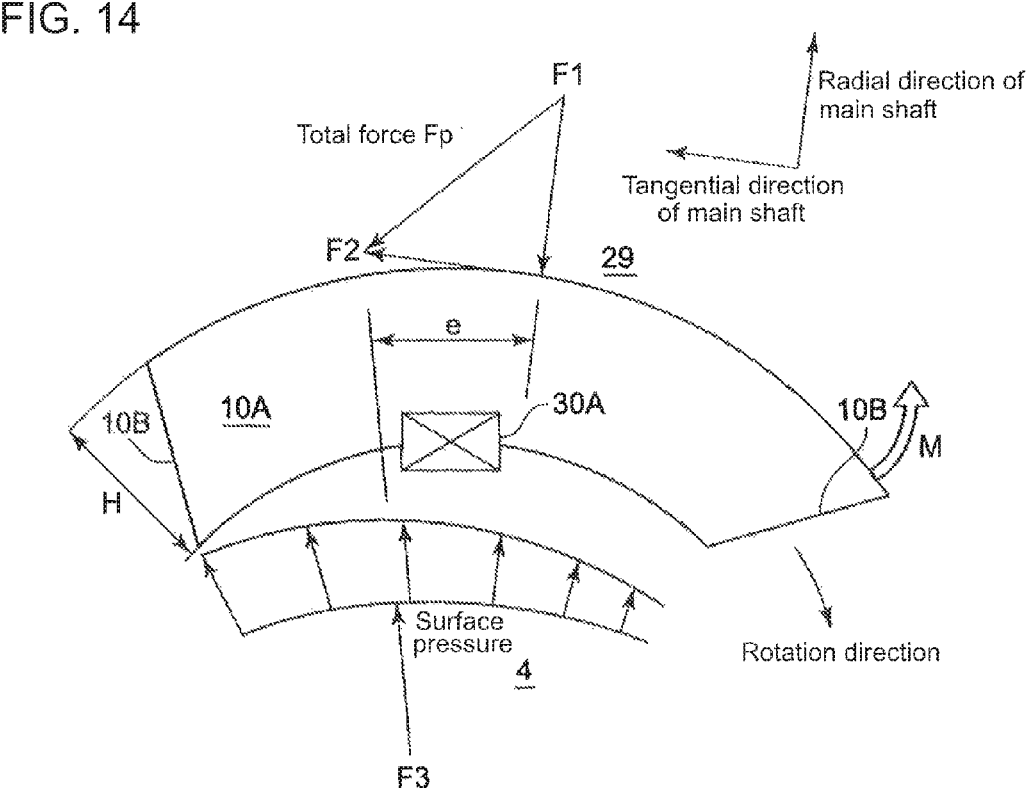
FIG. 14 is an illustration of forces acting on separated pieces of the cylindrical member.

FIG. 13 is a cross-sectional view of the main shaft 4 to which the hydraulic pump 5 is installed. FIG. 13 shows the main shaft 4, the cylindrical member 10 and the ring cam 29.

As shown in FIG. 13, the cylindrical member 10 is separated in the circumferential direction of the main shaft 4 into a plurality of separated pieces 10A each of which is provided for each of the key slots 25.

The number of the separated pieces 10A of the cylindrical member 10 is the same as the number of the key slots 25. The same number of the separated pieces 10A and the key slots 25 are provided.

Each of the separated pieces 10A of the cylindrical member 10 has a contact surface 10B which inclines with respect to the radial direction of the main shaft 4 such that the farther the contact surface 10B extends outwardly in the radial direction, the more the contact surface is displaced in a rotation direction of the main shaft 4.

The total force of the loads of the pistons 26 acting on the separated piece 10A is applied to the outer periphery of the ring cam 29. A tangential force F2 and a radial force F1 act respectively in a tangential direction and the radial direction of the main shaft 4.

The tangential force F2 causes a bending moment on the separated piece 10A. The tangential force F2 is multiplied by the height H of the separated piece 10 to calculate the bending moment which pushes the separated piece 10 to the direction opposite to the rotation direction of the main shaft 4.

The radial force F1 acts to press the separated piece 10A against the main shaft 4. The radial force F1 acts near the middle of the outer periphery of the separated piece 10 in the circumferential direction. The contact surface 10B of the separated piece 10 inclines in the rotation direction of the main shaft 4 and thus, the radial force F1 acts at a position that is on a downstream side of the reference key 30 in the rotation direction of the main shaft 4.

There are surface pressures from the main shaft 4, which are formed by the reaction force to the radial force F1 and the reaction force to the bending moment. The surface pressures increases for the amount of the bending moment near one end of the separated piece 10A that is on the opposite side to the rotation direction of the main shaft 4. Thus, the total force F3 of the surface pressures act at a position near the one end of the separated piece 10 that is on the side opposite to the rotation direction of the main shaft 4.

The radial force F1 acts at a position with a distance e away from the position of the total force 3. Thus, the moment in the direction of pushing the separated piece 10A to the main shaft 4 acts so to prevent the separated piece 10A from being lifted.

As shown in FIG. 13, the ring cam 29 provided on the outer periphery of the cylindrical member 10 is separated in the circumferential direction of the main shaft 4 into a plurality of arc-shaped pieces 29A.

In the circumferential direction of the main shaft 4, a position where the ring cam 29 is separated into the arc-shaped pieces 29A coincides with a position where the cylindrical member 10 is separated into the separated pieces 10A.

In this case, n1 that is a number of the separated pieces 10A of the cylindrical member 10 and n2 that is a number of the arc-shaped pieces 29A of the ring cam 29 satisfy a relationship of $n1/n2=1/m$ where m is a natural number.

The ring cam 29 is formed by the arc-shaped pieces 29A and, the position where the ring cam 29 is separated into the arc-shaped pieces 29A coincides with the position where the cylindrical member 10 is separated into the separated pieces 10A. Thus, it is possible to reduce obstruction of an inner corner of the arc-shaped piece 29a on the outer periphery of the separated piece 10A of the cylindrical member 10 and reduce obstruction of an outer corner of the separated-piece 10A on the inner periphery of the arc-shaped piece 29a.

The number of the arc-shaped pieces 29A that are in contact with the outer periphery of each of the separated piece 10A is set m. The force from the piston 26 of the hydraulic pump 5 is applied equally on each the separated, pieces 10A via m number of the arc-shaped pieces 29A. By this, the force can be equally exerted via each of the separated key pieces 10A upon the reference key 30A and the split keys 30B which are provided for each of the separated piece 10A of the cylindrical member 10.

Figure 15:
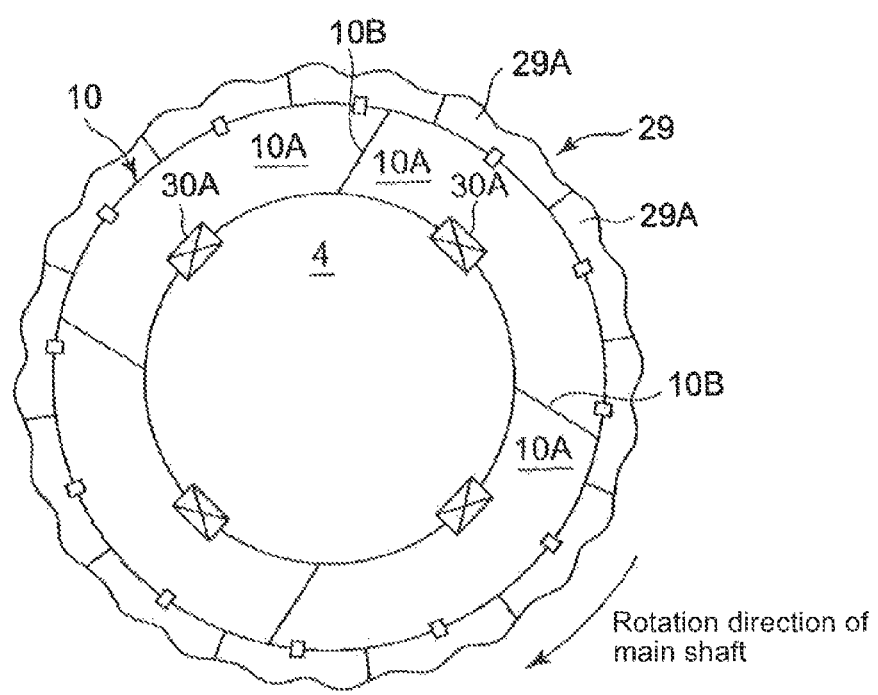
FIG. 15 is a cross-sectional view of the main shaft to which the hydraulic pump is installed and the main shaft, a cylindrical member and a ring cam are also shown in the drawing.

In the preferred embodiment, explained is the case where the position where the ring cam 29 is separated into the arc-shaped pieces 29A coincides with the position where the cylindrical member 10 is separated into the separated pieces 10A. However, the present invention is not limitative to this. As shown in FIG. 15, the position where the ring earn 29 is separated into the arc-shaped pieces 29A may be displaced in the circumferential direction of the main shaft 4 from the position where the cylindrical member 10 is separated into the separated pieces 10A.

In this case, n1 that is the number of the separated pieces of the cylindrical member and n2 that is the number of the arc-shaped pieces satisfy the relationship of $n1/n2=1/m$ where m is a natural number.

The position where the ring cam 29 is separated into the arc-shaped, pieces 29A is displaced in the circumferential, direction of the main shaft 4 from the position where the cylindrical member 10 is separated into the separated pieces 10A. By this, the inner corners of all of the arc-shaped piece 29a come in contact with the outer periphery of the separated piece 10A of the cylindrical member 10 and the outer corners of all of the separated-piece 10A come in contact with the inner periphery of the arc-shaped piece 29a. This prevents the obstruction of the inner corners of the arc-shaped pieces 29A and the outer corners of the separated pieces 10A with each other. When the position where the ring cam 29 is separated into the arc-shaped pieces 29A coincides with or is displaced from the position where the cylindrical member 10 is separated into the separated pieces 10A, the force from the pistons 26 of the hydraulic pump 5 is equally exerted on each of the separated pieces 10A via m number of the arc-shaped pieces 29A. By this, the force can be equally exerted via each of the separated key pieces 10A upon the reference key 30A and the split keys 30B.

In each of the above preferred embodiments, the wind turbine generator 1 is used as an operative example of the power generating apparatus of renewable energy type. However, the present invention is also applicable to different power generating apparatuses of renewable energy type.

For instance, the present invention may be applied to a power generating apparatus which uses tidal current, ocean current or river current to generate power and in which the tower 15 is installed under the sea or water and the main shaft 4 rotates by the rotation of the blades 2 receiving the tidal current, ocean current or river current.

REFERENCE SIGNS LIST

1 Wind turbine generator
2 Blade
3 Hub
4 Main shaft
5 Hydraulic pump
6 Hydraulic motor
7 Generator
8 Main shaft bearing
9 Main, shaft hearing
10 Cylindrical member
10A Split key
10B Contact surface
11 Main body
15 lower
16 Nacelle
17A High-pressure oil passage
17B Low-pressure oil passage
18 Hydraulic pump unit
20 First groove
21 Second groove
25 Key slot
26 Piston
27 Casing
28 Pump bearing
29 Ring cam
29A Arc-shaped piece
30 Key
30A Reference key
30B Split key
34A, 34B Side surface
36C, 36C Side surface
38 Screw hole
39 Adjusting screw
40 Cover member
50 First groove
51 Second groove
54B Split key
55 Key slot
56 Holding member
62 Split key
64 First key piece
64A Side surface
64B Side surface
66 Second key piece
66A Side surface
66B Side surface
68 Screw hole
70 First adjusting screw
72 Second adjusting screw

The invention claimed is:

1. A power generating apparatus of renewable energy type, comprising:
a hub to which a blade is installed;
a main shaft which is coupled to the hub at one end and has a plurality of first grooves;
a cylindrical member which is configured to rotate with the main shaft and has a plurality of second grooves;
a hydraulic pump which is installed on the main shaft via the cylindrical member;
a hydraulic motor which is driven by pressure oil supplied from the hydraulic pump; and
a generator which is coupled to the hydraulic motor,
wherein the hydraulic pump is configured to be driven by the main shaft and produces the pressure oil,
wherein the hydraulic motor is configured to be driven by the pressure oil and drives the generator,
wherein a plurality of key slots each of which is formed by a pair of each of the first grooves and each of the second grooves, and extends along an axial direction of the main shaft, and
wherein a plurality of keys is respectively inserted in the key slots.

2. The power generating apparatus according to claim 1, wherein the plurality of keys comprises:
a reference key which is inserted in one of the key slots; and
a split key which is separated into first and second key pieces and is inserted in the key slots other than the one of the key slot,
wherein the first and second key pieces of the split key respectively have side surfaces extending along a radial direction of the main shaft, at least one part of said side surface being formed into an inclined surface that inclines with respect to the axial direction of the main shaft, and
wherein said power generating apparatus further comprises a key-piece moving mechanism which moves at least one of the first and second key pieces of the split key within the key slot in the axial direction of the main shaft.

3. The power generating apparatus according to claim 2, wherein the split key is separated into the first and second key pieces at a separation plane which is parallel to the axial direction of the main shaft and along the radial direction of the main shaft,
wherein the side surface of the first and second key pieces has a portion that is in contact with a side wall of one of the first and second key grooves of the key slot and is parallel to the axial direction of the main shaft,
wherein the inclined surface is other one portion of the side surface of the first and second key pieces that is in contact with a side wall of the other of the first and second key grooves, and
wherein the key-piece moving mechanism moves both of the first and second key pieces within the key slot in the axial direction of the main shaft.

4. The power generating apparatus according to claim 2, wherein the first and second key pieces of the split key are respectively inserted in the first and second grooves of the key slot, wherein one of the first and second key pieces has a projection and the other of the first and second key pieces has a depression which engages with the projection of said one of the first and second key pieces, and wherein the inclined surface of the first and second key pieces is a contact lateral face between the projection and the depression.

5. The power generating apparatus according to claim 2, wherein the reference key is a single-piece member which is not separated.

6. The power generating apparatus according to claim 1, wherein the hydraulic pump comprises:

a ring cam member which is installed around the outer periphery of the cylindrical member;

a plurality of pistons which is driven by the ring cam member; and a cylinder which guides said plurality of pistons, wherein the cylindrical member is separated in the circumferential direction of the main shaft into a plurality of separated pieces each of which is provided for each of the key slots, and wherein each of the separated pieces of the cylindrical member has a contact surface which inclines with respect to the radial direction of the main shaft such that as the contact surface extends outwardly further in the radial direction, the contact surface is displaced more from the radial direction in a rotation direction of the main shaft.

7. The power generating apparatus according to claim 6, wherein the ring cam member is separated in the circumferential direction of the main shaft into a plurality of arc-shaped pieces, wherein n1 that is a number of the separated pieces of the cylindrical member and n2 that is a number of the arc-shaped pieces satisfy a relationship of $n1/n2=1/m$ where m is a natural number, and wherein in the circumferential direction of the main shaft, a position where the cylindrical member is separated into the separated pieces coincides with a position where the ring cam member is separated into the arc-shaped pieces.

8. The power generating apparatus according to claim 6, wherein the ring cam member is separated in the circumferential direction of the main shaft into a plurality of arc-shaped pieces, wherein n1 that is a number of the separated pieces of the cylindrical member and n2 that is a number of the arc-shaped pieces satisfy a relationship of $n1/n2=1/m$ where m is a natural number, and wherein in the circumferential direction of the main shaft, a position where the cylindrical member is separated into the separated pieces is displaced from a position where the ring cam member is separated into the arc-shaped pieces.

9. The power generating apparatus according to claim 1, wherein each of the key slots opens at the other end of the main shaft which is on a side opposite to the one end of the main shaft that is coupled to the hub on an opposite side to a side of the main shaft coupled to the hub, and wherein an open end of each of the key slots is covered by a cover member which is provided detachably on a side of the other end of the main shaft.

10. The power generating apparatus according to claim 1, wherein the first groove of each of the key slots is closed at the other end of the main shaft which is on a side opposite to the one end of the main shaft that is coupled to the hub, wherein the second groove of each of the key slots opens at the other end of the main shaft, and wherein an open end of the second groove is covered by a holding member which is provided detachably on a side of the other end of the main shaft to hold the cylindrical member.

11. The power generating apparatus according to claim 1, further comprising a pair of main shaft bearings which is provided between the one end of the main shaft coupled to the hub and the other end of the main shaft which is on a side opposite to the one end of the main shaft, the pair of main shaft bearings supporting the main shaft rotatably on a side of a main body, and wherein the hydraulic pump, the cylindrical member, the key slots and the keys are provided at the other end of the main shaft.

12. The power generating apparatus according to claim 1, wherein the power generating apparatus is a wind power generating apparatus which rotates the main shaft by wind received on the blade and drives the generator by rotation of the main shaft.

13. The power generating apparatus according to claim 1, wherein the cylindrical member is coaxially arranged on the main shaft, and the first groove is formed on an outer periphery of the main shaft and the second groove is formed on an inner periphery of the main shaft such that the first groove and the second groove face each other at the other end of the main shaft.

14. The power generating apparatus according to claim 13, wherein the plurality of keys has a reference key and split key, the split key including a first piece inserted in the first groove and a second piece inserted in the second groove, the first piece has a projected portion outwardly projecting toward the second groove and inclining with respect to the axial direction of the main shaft and the second piece has a depressed portion to engage the projected portion, such that the reference key and the split key are inserted in a case that the first groove is misaligned relative to the second groove.

15. A method of mounting a hydraulic pump for a power generating apparatus of renewable energy type which comprises a hub to which a blade is installed, a main shaft which is coupled to the hub at one end, a cylindrical member configured to rotate with the main shaft, the hydraulic pump which is installed to the main shaft via the cylindrical member, a hydraulic motor which is driven by pressure oil supplied from the hydraulic pump and a generator which is coupled to the hydraulic motor, wherein the hydraulic pump is configured to be driven by the main shaft and produces the pressure oil, and wherein the hydraulic motor is configured to be driven by the pressure oil and drives the generator, the method comprising the steps of:

forming a plurality of key slots in the circumferential direction of the main shaft so that the key slots extend along an axial direction of the main shaft, each of the key slots being constituted of a pair of a first groove formed on the main shaft and a second grooved formed on the cylindrical member; and inserting a plurality of keys respectively in the key slots to fix the cylindrical member to the main shaft.

16. The method of mounting the hydraulic pump according to claim 15, further comprising the steps of:
before inserting the keys respectively in the key slots, installing the hydraulic pump and the cylindrical member from the other end of the main shaft which is on a side opposite to the one end of the main shaft that is coupled to the hub by insertion of the main shaft to the hydraulic pump and the cylindrical member; and
after inserting the keys respectively in the key slots, covering open ends of the key slots each of which opens at the other end of the main shaft by a cover member.

17. The method of mounting the hydraulic pump according to claim 15, wherein the first groove of each of the key slots is closed at the other end of the main shaft which is on a side opposite to the one end of the main shaft that is coupled to the hub,
wherein the second groove of each of the key slots opens at the other end of the main shaft,
wherein the method further comprises the steps of:
after inserting the keys respectively in the first grooves, installing the hydraulic pump and the cylindrical member from the other end of the main shaft by insertion of the main shaft to the hydraulic pump and the cylindrical member; and then
covering an open end of the second groove by a holding member.

18. A power generating apparatus of renewable energy type, comprising:
a hub to which a blade is installed;
a main shaft which is coupled to the hub at one end and has a plurality of first grooves;
a cylindrical member which is configured to rotate with the main shaft and has a plurality of second grooves;
a hydraulic pump which is installed on the main shaft via the cylindrical member;
a hydraulic motor which is driven by pressure oil supplied from the hydraulic pump; and
a generator which is coupled to the hydraulic motor,
wherein the hydraulic pump is configured to be driven by the main shaft and produces the pressure oil,
wherein the hydraulic motor is configured to be driven by the pressure oil and drives the generator,
wherein a plurality of key slots each of which is formed by a pair of each of the first grooves and each of the second grooves, extends along an axial direction of the main shaft,
wherein a plurality of keys is respectively inserted in the key slots,
wherein the plurality of keys comprises:
a reference key which is inserted in one of the key slots; and
a split key which is separated into first and second key pieces and is inserted in the key slots other than the one of the key slot,
wherein the first and second key pieces of the split key respectively have side surfaces extending along a radial direction of the main shaft, at least one part of said side surface being formed into an inclined surface that inclines with respect to the axial direction of the main shaft, and
wherein said power generating apparatus further comprises a key-piece moving mechanism which moves at least one of the first and second key pieces of the split key within the key slot in the axial direction of the main shaft.

* * * * *